United States Patent
Sadok et al.

(10) Patent No.: US 9,355,043 B2
(45) Date of Patent: May 31, 2016

(54) CACHE REPLACEMENT METHOD AND SYSTEM

(75) Inventors: Djamel Sadok, Jaboatão dos Guararapes (BR); Josilene Aires Moreira, Joao Pessoa (BR); Márcio De Mendonca Neves, Olinda (BR); Victor Souza, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 162 days.

(21) Appl. No.: 14/239,419

(22) PCT Filed: Sep. 15, 2011

(86) PCT No.: PCT/IB2011/002156
§ 371 (c)(1),
(2), (4) Date: Feb. 20, 2014

(87) PCT Pub. No.: WO2013/038220
PCT Pub. Date: Mar. 21, 2013

(65) Prior Publication Data
US 2014/0223107 A1  Aug. 7, 2014

(51) Int. Cl.
*G06F 12/12* (2006.01)
*H04N 21/231* (2011.01)
*H04L 29/08* (2006.01)

(52) U.S. Cl.
CPC .......... *G06F 12/126* (2013.01); *H04L 67/2852* (2013.01); *H04N 21/23113* (2013.01); *G06F 2212/69* (2013.01)

(58) Field of Classification Search
None
See application file for complete search history.

(56) References Cited

U.S. PATENT DOCUMENTS

| | | | |
|---|---|---|---|
| 6,463,508 B1 | 10/2002 | Wolf et al. | |
| 7,251,649 B2 | 7/2007 | Shen et al. | |
| 2005/0097085 A1* | 5/2005 | Shen | G06F 17/30902 |
| 2007/0073975 A1* | 3/2007 | Lee | G06F 12/127 711/133 |

OTHER PUBLICATIONS

International Preliminary Report on Patentability issued in corresponding International Application No. PCT/IB2011/002156, mailed Mar. 27, 2014.

Lei Guo, et al.; "Design and Evaluation of a Scalable and Reliable P2P Assisted Proxy for On-Demand Streaming Media Delivery"; IEEE Transactions on Knowledge and Data Engineering, vol. 18, No. 5; IEEE Computer Society; ISSN: 1041-4347; May 2006; pp. 669-682.

(Continued)

*Primary Examiner* — Idriss N Alrobaye
*Assistant Examiner* — Dayton Lewis-Taylor
(74) *Attorney, Agent, or Firm* — Patent Portfolio Builders PLLC (57) ABSTRACT

A system, computer readable medium and method for managing objects in a cache. The method includes receiving a request for a desired object that is not stored in the cache; determining, based on an admission policy, whether one or more segments of a least popular existing object need to be removed from the cache for admitting one or more segments of the desired object into the cache; removing, when there is no space in the cache for the desired object, the one or more segments of the least popular existing object from the cache based on a replacement policy, wherein the replacement policy includes a caching priority function for determining that the least popular existing object is the least popular object of all objects stored by the cache; and admitting at least one segment of the desired object into the cache.

20 Claims, 9 Drawing Sheets

(56) References Cited

OTHER PUBLICATIONS

Michael Zink, et al.; "Watch Global, Cache Local: YouTube Network Traffic at a Campus Network—Measurements and Implications"; University of Massachusetts—Amherst; ScholarWorks@UMass Amherst; Computer Science Department Faculty Publication Series—Computer Science; 2008; pp. 1-14. [Downloaded from the internet on Apr. 8, 2014: http://scholarworks.umass.edu/cs_faculty_pubs/177].

Anna Satsiou, et al.; "Efficient Caching of Video Content to an Architecture of Proxies according to a Frequency-Based Cache Management Policy"; Laboratory of Information and Computer Networks, Department of Electronic and Computer Engineering, Technical University of Crete, Oct. 10, 2006; pp. 1-9; Pisa, Italy.

Zhourong Miao, et al.; "Proxy caching for efficient video services over the Internet"; Integrated Media Systems Center, Signal and Image Processing Institute, Department of Electrical Engineering-Systems, University of Southern California; 1999; pp. 1-21; Los Angeles, CA. [Downloaded from the Internet on Apr. 8, 2014— http://sipi.usc.edu/~ortega/Papers/pvw99-miao.pdf].

Songqing Chen, et al.; "Segment-based Proxy Caching for Internet Streaming Media Delivery"; Department of Computer Science, George Mason University, IEEE Computer Society; 2005; pp. 1-9. [Downloaded from the Internet on Apr. 8, 2014—http://www.cse.ohio-state.edu/hpcs/WWW/HTML/publications/papers/TR-05-10.pdf].

Anna Satsiou, et al.; "Impact of Frequency-Based Cache Management Policies on the Performance of Segment Based Video Caching Proxies"; Laboratory of Information and Computer Networks, Department of Electronic and Computer Engineering, Technical University of Crete; Networking 2004, Networking Technologies Services, and Protocols; Performance of Computer and Communication Networks; Mobile and Wireless Communication; Third International IFIP-TC6 Networking Conference; May 9-14, 2004; pp. 1120-1131; Athens, Greece.

Meeyoung Cha, et al.; "I Tube, You Tube, Everbody Tubes: Analyzing the World's Largest User Generated Content Video System"; Telefonica Research; IMC'07, Oct. 24-26, 2007; pp. 1-13; San Diego, CA.

Subhabrata Seny; "Proxy Prefix Caching for Multimedia Streams"; CMPSCI Technical Report 98-27, University of Massachusetts; Jan. 1999; pp. 1-26. New York, NY.

Kun-Lung Wu, et al.; "Segment-Based Proxy Caching of Muldimedia Streams"; 10th International World Wide Web Conference; Hong Kong Covention and Exhibition Center; ISBN: 1-58113-348-0; May 1-5, 2001; pp. 36-44; Hong Kong, China.

Songqing Chen, et al.; "Adaptive and Lazy Segmentation Based Proxy Caching for Streaming Media Delivery"; NOSSDAV '03 Proceedings of the 13th international workshop on Network and operating systems support for digital audio and video; ACM New York, NY, USA © 2003; ISBN:1-58113-694-3; Jun. 1-3, 2003; pp. 22-31; Monterey, CA.

International Search Report issued in corresponding International Application No. PCT/IB2011/002156, date of mailing Jun. 4, 2012.

Chen, Songqing, et al., "Adaptive and Lazy Segmentation Based Proxy Caching for Streaming Media Delivery," NOSSDAV '03, Proceedings of the International Workshop on Network and Operating System Support for Digital Audio and Video, Monterey, CA, USA, Jun. 1, 2003, pp. 22-31, XP002322646, DOI: 10.1145/776322.776328, ISBN: 978-1-58113-694-4.

Liu, Wei, et al., "Popularity-wise Proxy Caching for Interactive Streaming Media," Computational Systems Bioinformatics Conference, 2004, CSB 2004, Proceedings, Tampa, FL, USA, Nov. 16-18, 2004; Los Alamitos, CA, USA, IEEE (Comput. Soc. US), Nov. 16, 2004, pp. 250-257, XP010753079, DOI: 10.1109/LCN.2004.96, ISBN: 978-0-7695-2260-9.

Satsiou, Anna, et al., "Impact of Frequency-Based Cache Management Policies on the Performance of Segment Based Video Caching Proxies," Networking 2004, Networking Technologies, Services, and Protocols; Performance of Computer and Communication Networks; Mobile and Wireless Communications; Lecture notes in Computer Science, Springer-Verlag, Berlin/Heidelberg, XP019005653, ISBN: 978-3-540-21959-0.

Aires Moreira, Josilene, "Cache Strategies for Internet-based Video on-Demand Distribution," Tese de Doutorado (translation: PhD thesis), Recife, Recife, 15 de Março de 2011 (translation: reef, Mar. 15, 2011).

* cited by examiner

CACHE REPLACEMENT METHOD AND SYSTEM

TECHNICAL FIELD

The present invention generally relates to systems, software and methods and, more particularly, to mechanisms and techniques for replacing/admitting objects in a cache.

BACKGROUND

During the past years, computing devices such as computers, mobile phones, game consoles, personal digital assistants, etc., have evolved so much that a large variety of content is now consumed with these devices. Most of the content, e.g., media files, is stored in caches distributed closer to the users. As users' preferences for content change continuously and the amount occupied by the content is increasing, caches need smart replacement algorithms for updating their content. In general, a cache replacement algorithm is responsible for populating a cache and for deciding which objects stay and which ones should be removed when new objects are requested. Thus, the replacement algorithm essentially controls the functioning of the cache.

A known cache replacement algorithm is the Least Recently Used (LRU) algorithm. According to this algorithm, objects are always admitted to the cache. When the cache is full, the least recently used object is identified and deleted to make room for a new object. That is, the object that has been in the cache the longest time without being used is selected for elimination. A cache using this algorithm needs to keep track of when each object was last used.

Proxy cache servers are deployed in a network to replicate content near to the end-user. The proxy cache servers increase the performance of the network by decreasing user perceived latency, traffic congestion and the load on the content provider's servers. All these cache servers need a cache replacement algorithm.

In the past, various studies regarding replacement algorithms for proxy caches were focused on static text based objects such as Hypertext Markup Language (HTML) web pages and images. Recently, however, most of the Internet traffic originates from video and media applications. Thus, cache servers designed specifically for dealing with media streaming face several new aspects due to the higher complexity of streaming applications, as noted, for example, in Chen et al., "Adaptive and lazy segmentation based proxy caching for streaming media delivery," Proceedings of the 13th international Workshop on NOSSDAV, Monterey, Calif., USA, (June 2003), in Chen et al., "Segment-Based Proxy Caching for Internet Streaming Media Delivery," IEEE MultiMedia 12, 3 (July 2005) and in Wu, K., "Segment-based proxy caching of multimedia streams," Proceedings of the 10th Intern. Conference on WWW, Hong Kong (2001).

Differently from static web objects, media streams have a large size (hundreds of megabytes to gigabytes) and therefore caching the entire object is impractical since a few objects would quickly exhaust the cache space. To address this problem, a segmentation technique of the objects has been used. Besides large file sizes, multimedia applications have to deal with a complex and longer lifespan of streaming objects, and also with guaranteeing an acceptable quality of experience.

To improve caching of media streaming content, particular algorithms for cache replacement were proposed. Some of these are (i) Adaptive and Lazy Segmentation algorithm disclosed in Chen et al., "Adaptive and lazy segmentation based proxy caching for streaming media delivery," Proceedings of the 13th international Workshop on NOSSDAV, Monterey, Calif., USA, (June 2003), (ii) Segment-based algorithm disclosed in Wu, K., "Segment-based proxy caching of multimedia streams," Proceedings of the 10th Intern. Conference on WWW, Hong Kong (2001) and (iii) a least recently least frequently used (LRLFU) algorithm disclosed in Satsiou et al., "Impact of Frequency-based Cache Management Polices on the Performance of Segment Based Video Caching Proxies," Proceedings of the 3rd IFIP Networking Conference, pp. 1120-1131 (May 2004), the entire contents of these documents being incorporated by reference herein. These algorithms are based on segmentation approaches and object's popularity information, providing a better utilization of the available storage space.

Sen et al. presents in "Proxy prefix caching for multimedia streams," Proceedings of IEEE INFOCOM'99, IEEE Computer Society (1999), a new caching algorithm called Partial Caching. This caching algorithm stores the initial segments (prefix) of the multimedia objects. When receiving a request for a specific object, the initial frames of that object, that are stored in the cache, are transmitted to the user while the cache recovers the rest (suffix) of the object (simultaneously) from a main server. This and other documents also discuss an optimal size of the prefix, and argue that prefix caching can decrease the start-up delay and reduce traffic between the server and the proxy for popular content. Similar work that proposes the idea of selective caching has been investigated by Miao and Ortega in, "Proxy Caching for Efficient Video Services over the Internet," Proceedings of the 9th International Packet Video Workshop (1999). In this approach, not only the prefix of the object is stored but any part of it preventing possible playback delays and allowing seek operations in the stream.

Chen et al. proposes in "Segment-Based Proxy Caching for Internet Streaming Media Delivery," IEEE MultiMedia 12, 3 (July 2005), a segment-based proxy-caching algorithm in which a streaming object is partitioned into exponential variable sized objects based on their distance from the beginning of the object. In this work, the segment size increases exponentially, i.e., the $i^{th}$ segment has a size $2^{i-1}$. With this approach, the cache can discard half of the cached object with a single action improving cache management. The number of segments to be cached for each object is based on the frequency of access and the segment distance from the beginning of the media. The admission policy applies different criteria for the various (beginning and later) segments of an object, based on a segment number. This technique reduces the cache-replacement granularity compared to the prefix/suffix algorithm and also achieves a better byte-hit ratio.

However, this approach has some parameters, such as the number of initial segments (Kmin) and the capacity of the cache reserved for them (Cinit), that have to be pre-configured according to workload's characteristics in order to achieve its maximum performance.

Another algorithm disclosed in Satsiou and Paterakis "Efficient caching of video content to an architecture of proxies according to a frequency-based cache management policy," Proc. of the 2nd Intern. Workshop on Advanced Archit. and Algorithms for Internet Delivery and Applications, ACM, New York, USA (2006), proposes an algorithm aimed at capturing changes in object popularity considering both the newness and frequency of the requested object, i.e., an LRLFU approach. This scheme is based on the exponential segment-based but introduces a new policy of caching replacement by blending aspects of least recently used (LRU) and least frequently used (LFU) algorithms. It outperforms the exponential strategy in terms of byte-hit ratio and fraction of requests with delayed start but still has the same drawbacks of the pre-configured parameters (Kmin and Cinit) which need to be customized for each workload characteristics.

The Adaptive and Lazy Segmentation based caching algorithm discussed above tries to adapt the segmentation to the last user's access statistics and segments the object only after retrieving sufficient user's behavior information. This scheme includes an aggressive admission policy, a lazy segmentation approach and a two-phase iterative replacement policy. The algorithm captures the object popularity through a complex caching utility function. Although this strategy achieves high rates of byte-hit ratio, it does not perform well in terms of preventing initial start-up latency.

The Lazy strategy was extended to a peer-assisted media distribution system. In this new approach, a segment-based peer-to-peer (P2P) media system called PROP, "collaborating and coordinating PROxy and its P2P clients" is used to distribute multimedia content using the P2P overlay network and the proxy cache. While in the Lazy's proposal the priority-based function is applied at the level of objects in the proxy cache, in PROP the same priority-based function is applied at the level of segments of the P2P system.

For example, the popularity of a segment is defined by $$p = \frac{\frac{S_{sum}}{S_0}}{(T_r - T_0)} * \min\left\{1, \frac{T_r - T_0}{t - T_r}\right\},$$

where t is the current time, $T_0$ is the time when the segment is accessed for the first time, $T_r$ is the most recent access time of the segment, $S_{sum}$ is the cumulative bytes that the segment has been accessed, $S_0$ is the size of the segment in bytes, n is the number of requests for this segment, $$\frac{\frac{S_{sum}}{S_0}}{(T_r - T_0)}$$

represents the average access rate of a segment in the past normalized by the segment size, $$\min\left\{1, \frac{T_r - T_0}{t - T_r}\right\}$$

represents the probability of the future accesses, and $$\frac{T_r - T_0}{n}$$

is the average time interval of accesses in the past.

If $$t - T_r > \frac{T_r - T_0}{n},$$

the possibility that a new request arrives is small. Similarly to Lazy's approach, the segment with the lowest value for p is chosen by the algorithm to be removed when the cache is full.

Some of the problems of the existing caching algorithms are now discussed. First, it is difficult to achieve an algorithm able to improve both byte-hit ratio and startup delay metric, providing a balanced performance for both metrics. Second, the core solutions that reduce the number of media files with delayed start require manual configuration according to the workload to achieve a good performance. The existing solutions also show that it is difficult to obtain an increase in the byte hit ratio performance.

Accordingly, it would be desirable to provide devices, systems and methods that avoid the afore-described problems and drawbacks.

SUMMARY

Assets as, for example, content are desired to be provided to the users from locations that are most suitable to the users. A suitable location may be a location that is closest to the user. In this way, receiving the content from a location closest to the user frees bandwidth in the network and/or reduces a time for receiving the asset. Thus, a network operator provides caches at these locations that are closer to the users. An amount of content requested by the users is continuously increasing. A cache replacement algorithm handles the content that is stored or removed from the cache. However, the existing algorithm suffer from various problems, as discussed above. Novel embodiments discussed next overcome some of these problems.

According to one exemplary embodiment, there is a method for managing objects in a cache. The method includes a step of receiving a request for a desired object that is not stored in the cache; a step of determining, based on an admission policy, whether one or more segments of a least popular existing object need to be removed from the cache for admitting one or more segments of the desired object into the cache; a step of removing, when there is no space in the cache for the desired object, the one or more segments of the least popular existing object from the cache based on a replacement policy; and a step of admitting at least one segment of the desired object into the cache. The replacement policy includes a caching priority function for determining that the least popular existing object is the least popular object of all objects stored by the cache.

According to another exemplary embodiment, there is a cache having an algorithm for managing objects. The cache includes a storing device for storing the objects and a processor connected to the storing device and configured to execute the algorithm. The algorithm includes commands similar to the method discussed above.

Thus, it is an object to overcome some of the deficiencies discussed in the previous section and to provide a cache replacement algorithm that is capable to provide the desired content to a user with a short delay and a high byte hit ratio. One or more of the independent claims advantageously provides such a cache replacement algorithm.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a cache and a cache replacement policy. However, the embodiments to be discussed next are not limited to a cache but may be applied to other systems that need a replacement policy.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an exemplary embodiment, there is a cache having an algorithm for managing objects. The cache includes a storing device for storing the objects, and a processor connected to the storing device and configured to execute the algorithm. The algorithm includes instructions for determining the processor (i) to receive a request for a desired object that is not stored in the storing device, (ii) to determine, based on an admission policy, whether one or more segments of a least popular existing object need to be removed from the storing device for admitting one or more segments of the desired object, (iii) to remove, when there is no space in the storing device for the desired object, the one or more segments of the least popular existing object based on a replacement policy, and (iv) to admit at least one segment of the desired object into the storing device. The replacement policy may include a caching priority function for determining that the least popular existing object is the least popular object of all objects stored by the storing device The above steps are now discussed in more detail. It is noted that the caching algorithm may be implemented in two variants. The first one achieves a better performance for byte hit ratio than the conventional Lazy approach, which is the baseline for this metric. As this first novel approach inserts the complete media file at the first request, it tends to provide a better byte hit ratio. The second novel approach provides the best balanced performance, providing an increased byte-hit ratio and reducing the startup delay for many different scenarios.

Different from some existing algorithms, the proposed novel strategies achieve the best performance without any parameter configuration regarding the workload. The size of a first segment to be cached is adapted according to the size of the object, which provides an adaptive approach considering variations according to the workload.

The two novel approaches use a cache replacement strategy that includes a segmentation technique based on the size of the objects together with a function that assigns priorities to the cached objects. The function combines information as accesses frequency, number of requests and popularity of the objects to define the importance of each object, and thus select those objects with lower priority to be removed from the cache when necessary. One variation aims at reducing the start-up delay latency (to increase the quality of experience of the user) and increasing the byte-hit ratio in a balanced manner while the other variation aims at increasing the byte-hit ratio (consequently reducing bandwidth consumption) over the start-up delay.

Figure 1:
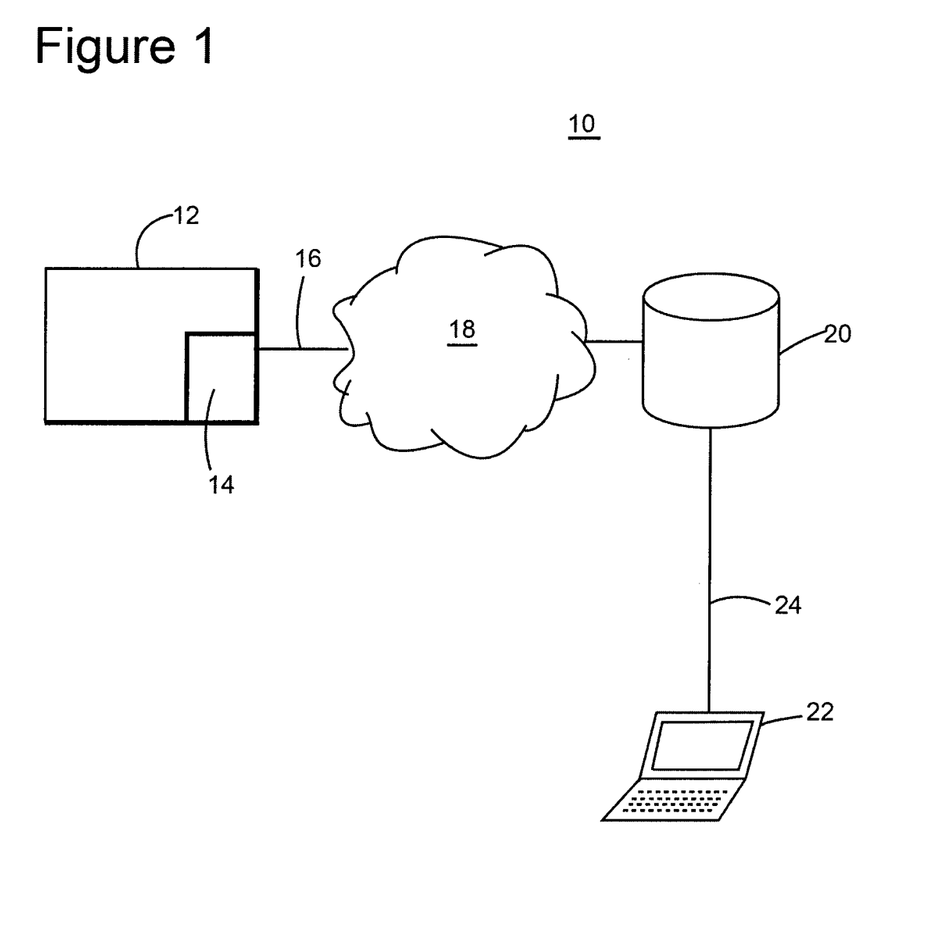
FIG. 1 is a schematic diagram of a communication network having a cache.

The two novel approaches may be implemented in a general system as shown in FIG. 1. Such a system 10 may include a content originator 12 that is responsible for producing a media file 14 (object). The media file 14 may be, for example, a video file, an audio file, etc. The media file 14 is provided along a link 16 (e.g., Internet, wireless communication, etc.) to a network 18. The network 18 may be, for example, a telecommunication network. A cache 20 may be provided outside or inside the network 18, close to a user. The cache 20 is configured to implement one or more cache replacements algorithms for being capable to store the media file 14 in an optimal way.

A user's terminal 22 connects through a link 24 to the cache 20. The link 24 may be wired or wireless. The terminal 22 may be a fixed device, e.g., a desktop, or a mobile device, e.g., smart phone, tablet, etc. The cache replacement algorithms may be stored at the cache 20, in the network 18 or distributed at the network 18 and the cache 20.

Focusing now on the first novel approach (cache replacement algorithm), it is noted that an exponential segmentation of objects reduces the cache management complexity, allowing quick discard of large portions of non-popular objects. However, in such a scheme, the segmentation strategy does not consider the object size leading to several problems in the computation of the initial segment size. The initial segment size in this traditional scheme is pre-configured through the Kmin parameter (static configuration), as already discussed above. Because these segments are relevant to the start-up delay, such static configuration can overestimate or underestimate their size, resulting in problems like bad utilization of the cache space and consequently reducing the whole algorithm's efficiency.

Some of these problems are solved by the first new approach, called Proxy Cache Conservative Approach (PCCA), by determining the initial segment size as a fixed faction of the media object length. The new segmentation method utilizes the concept of a prefix (e.g., 5-15% of the object's total length) to determine the size of the first segment. Thereafter, an exponential method is applied where the second segment may be twice the size of the first; the third may be twice the size of the second, and so on. The exponential method may include another type of function, where the second segment is exponentially larger than the first segment, and so on. By taking this approach, it is possible to create a dynamic exponential segmentation which varies with a size of the media file and reduces the problems that exist in pre-configured prefix size computation.

Figure 2:
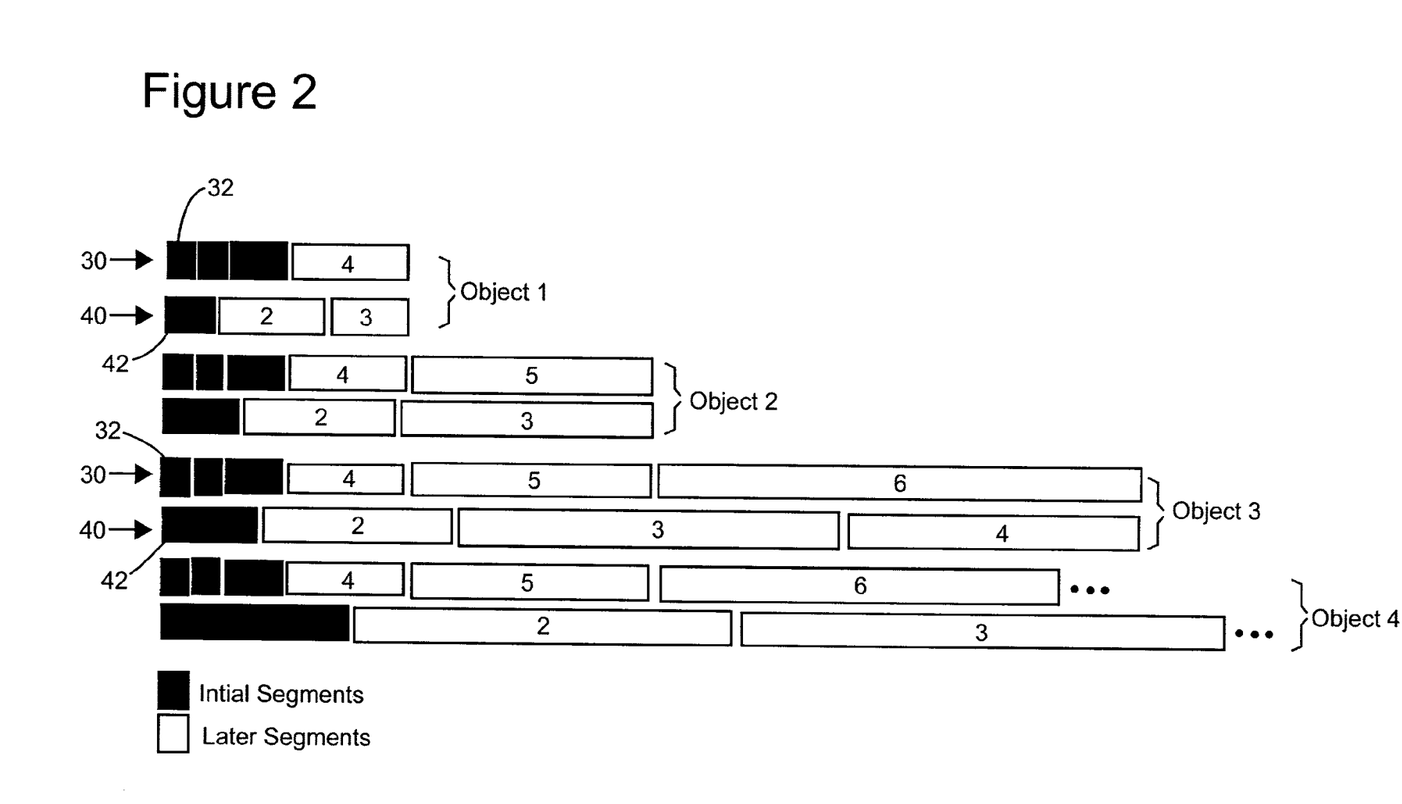
FIG. 2 is a schematic diagram illustrating object segmentation according to an exemplary embodiment.

FIG. 2 illustrates a traditional segmentation process 30 in which the first segment 32 has a fixed size irrespective of the size of the object. On the contrary, the new segmentation process 40 determines the size of the first segment 42 based on the total size of the object. For example, the size of the first segment 42 may be a fraction of the entire size of the object.

The new cache replacement algorithm PCCA includes, besides a new segmentation process, also a new admission policy. According to an exemplary embodiment, for achieving an improved efficiency, a two-phase admission policy is introduced. A first phase of the admission policy handles an object when there is sufficient free space to cache the entire object. If this is the case, the entire object is cached. However, as soon as the storage space becomes full (i.e., not enough space left to fully cache a new object), the cache enters the second phase of the admission process.

Figure 3:
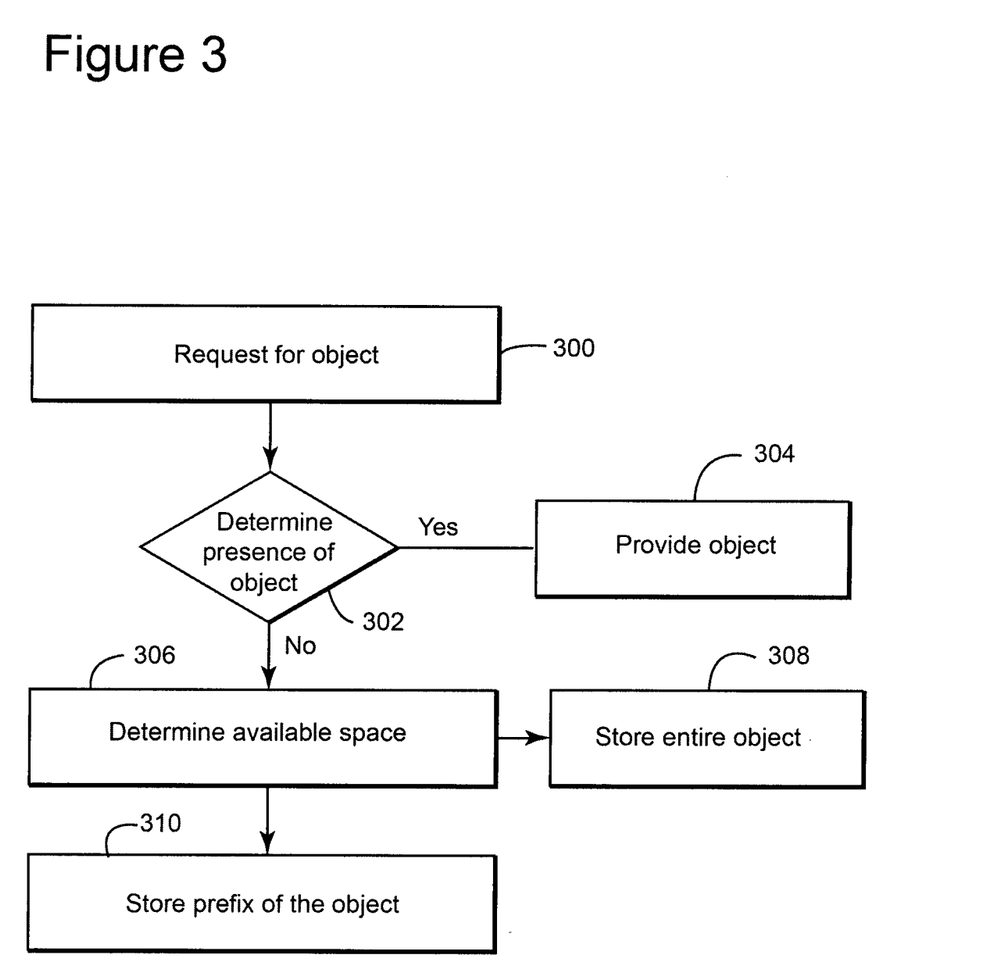
FIG. 3 is a flowchart of a caching algorithm according to an exemplary embodiment.

The two phases are illustrated in FIG. 3, in which a request for the object from a terminal is received in step 300 by the cache. In step 302, a functionality of the cache determines whether the object is present in the cache. If the answer is yes, in step 304 the cache provides the object to the terminal. If the answer is no, in step 306 another functionality of the cache determines whether there is enough space to accommodate the entire object. If there is enough space, then phase one is activated and the entire object is stored in step 308. However, if there is not enough space for the new object, then phase two is activated.

In the second phase, a prefix of the requested object is stored in step 310 in the cache. The others segments of the requested object become eligible for caching on subsequent requests. With this admission scheme, it is possible to obtain a strategy that behaves aggressively when there is available free storage space and start to function more selectively when this space is saturated. When the space is saturated, the novel method chooses only the popular segments, prioritizing the initial segments, which are important for reducing the start-up delay perceived by the user. In other words, having stored the first segment of the requested object, the cache is capable to quickly provide a user with this segment of the object upon request. Then, the cache requires the remaining segments of the requested object from the network.

The process of storing the prefix of the desired object and also a process of removing not so popular existing objects are part of a replacement policy. The replacement policy is part of step 310 of FIG. 3. When there is no free space for the request object, a priority function is computed for every object that is stored in the cache. The object for which the priority function has, for example, the lower value, i.e., the object with the lower popularity, is chosen for eviction from the cache. The object is not evicted in its entirety at this time. The last segment of the evicted object is removed first from the cache and then this procedure is repeated until there is enough free space in the cache to store a current segment of the new object being requested. However, a first segment of the object that is removed can be replaced only with a first segment of a new object.

Figure 4:
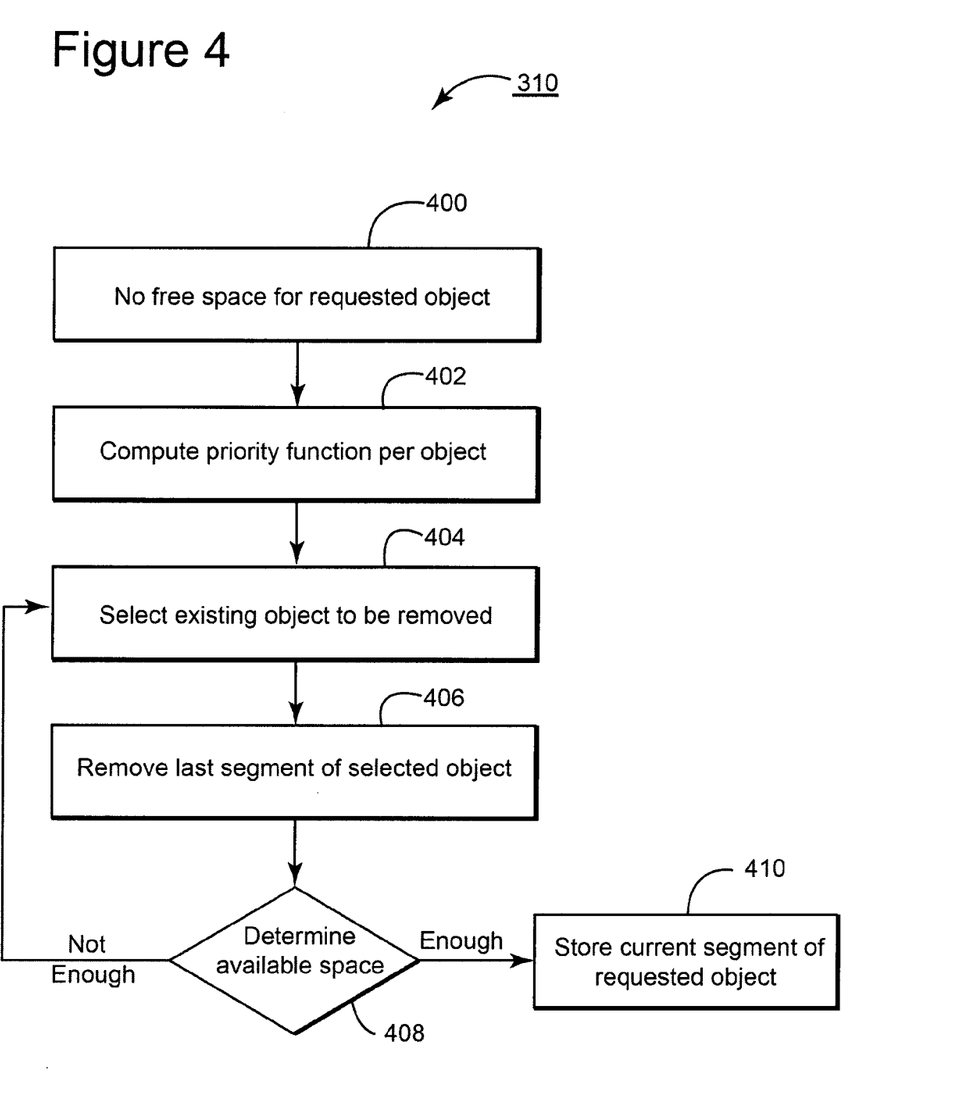
FIG. 4 is a flowchart detailing some steps of a caching algorithm according to an exemplary embodiment.

This process is illustrated in FIG. 4 in which in step 400 a determination is made that there is not enough space for the requested object. In this case, a priority function is calculated in step 402 for each of the existing objects in the cache. The object having the lowest value for the priority function is selected in step 404 for being removed. In step 406 the last segment of this object is removed and in step 408 it is again determined the available space in the cache. If there is still not enough free space for the new object, the process returns to step 406 to remove another segment of the selected object. Otherwise the process advances to step 410 in which a current segment of the requested object is stored. In another exemplary embodiment, if there is not enough space after step 408, the algorithm may return to step 402 instead of step 406, to recalculate again the least popular object. Thus, for this exemplary embodiment it is possible to remove segments from various objects for making enough free space for the requested object.

The approach noted above uses a new caching priority function (CP) which considers several aspects like, the access frequency, the access number, and the probability of future access. These parameters may be kept in a data structure maintained for each entry in the cache. The CP function may be:

$$CP = \frac{n}{(T_c - T_r)} * \text{MIN}\left\{1, \frac{T_r - T_1}{\frac{n}{T_c - T_r}}\right\},$$

where n is the number of accesses for the entry, $T_c$ is the current timestamp, $T_r$ is the last access time, $T_1$ is the first access time, $$\frac{n}{(T_c - T_r)}$$

is the request frequency, and $$\text{MIN}\left\{1, \frac{T_r - T_1}{\frac{n}{T_c - T_r}}\right\}$$

is the probability of future accesses.

This function is different from existing functions because it explores how popular an object (not segment of an object) is by estimating its access frequency and how new the object is, thus improving the selection of the object to be removed through the probability of future access. The new cache priority function uses the last access, frequency and future access probability to better select the object to be removed.

The probability of future accesses can be captured using, for example, information like number of accesses and time of accesses. The function uses the quantity $T_c$-$T_r$, which represents the interval between the current time and the last access to the object; and $$\frac{T_r - T_1}{n}$$

which represents the average time interval for an access happening in the past. Thus, if $$T_c - T_r < \frac{T_r - T_1}{n},$$

there is a high probability of an access arrival to the same object to take place soon; otherwise, the probability is considered to be very small.

The novel CP function does not evaluate the popularity of the segments as in Guo et al. "Design and Evaluation of a Scalable and Reliable P2P Assisted Proxy for On-Demand Streaming Media Delivery", in IEEE Transactions on Knowledge and Data Engineering (May 2006). As noted above, the novel approach of this exemplary embodiment uses the CP function for determining the popularity of the objects in the cache.

Further, the new replacement policy differs from existing policies in several aspects. For example, the request frequency used in Guo, e.g., PROP, is the ratio between the total number of requests to the time period between the first request and the last request to the same object. The request frequency used in the new CP function is the ratio of the total number of requests to the time period between the current time and the last access to the object. Thus, for a given number of requests (n), if this period of time is small, it means that the object has been requested frequently and the resultant request frequency is high; otherwise, the period of time is large, so the resultant request frequency becomes small. Using this approach, the novel approach is able to capture the tendency of the request frequency in time.

Further, while the size of the segments is fixed in the PROP algorithm (it varies from 100 to 500 KB), the novel segmentation approach used by the exemplary embodiment is an exponential scheme in which a size of the first segment varies as a percentage of the size of the object. This novel exponential scheme enables the algorithm to remove larger segments of the least popular objects from the proxy cache in a small number of operations, releasing a larger area in the cache for the most popular objects to be stored.

Another difference between the existing methods and the novel approach of this exemplary embodiment is that according to the new replacement policy, a first segment of an existing object can only be replaced by another first segment of a new object. This rule helps to maintain the prefixes of a large number of objects stored in the cache.

A pseudo-code that may be implemented in a processor for achieving the steps noted in FIGS. 3 and 4 may be as described below:

is the first request of the object or not. If it is the first request of the object, the first segment of the object is always cached (line 14). To obtain the more space, the CP function is calculated for determining the object to be removed. When the eviction object is selected, its segments are then removed starting from the last segment, until enough space become available for the insertion of the new object (see lines 14-20 in the code). Then, the segment of the new object is cached. Any segment (except the first one) of an existing object can be removed to cache the first segment of the requested object.

If there is not available space in the cache but the object was already requested, the eviction policy is invoked to release space for the segment under request, and the requested segment is cached (see lines 4-13 in the code). In this case, the first segment of the eviction victim can only be removed to be replaced by another first segment.

Turning now to the second variation of the cache replacement algorithm, i.e., the Proxy Cache Aggressive Approach (PCAA), this approach differs from PCCA in the admission policy. The PCAA is more "aggressive" because any requested object will be completely stored in the cache no matter whether it is the first request or not. This is different from PCCA in which a prefix of the object is stored at the first request and then various segments of the requested object are stored as new requests are received. The object in this second approach is segmented exponentially as in PCCA approach.

When the cache is full, the same priority function CP as for PCCA is used to find the less popular objects and evict their segments from the cache until enough space becomes available for the new entry. While in the PCCA approach the first segment of an object can only be replaced by another first segment of a new object, this restriction is removed in PCAA. Thus, a higher number of segments are evicted at every object insertion, since the entire object is cached. Although a large number of replacements occur in PCAA, it is expected that

```
1.  if (there is enough free space for segment i) {
2.      cache segment i
3.  }else{
4.      if (object a was already requested){ /* cache the requested segment */
5.          while (there is not enough free space for segment i) && (replacement candidate
6.              can still be found){
7.              compute caching priority function for all the objects in the cache
8.              find the eviction victim /* entry with less valuable priority */
9.              removes the last segment of the eviction victim, except by the first segment
10.                 and increase free space /* do note remove the first segment */
11.         }
12.         if (there is enough free space for segment i of object a)
13.             cache segment i
14.     }else if (segment i == 0){ /*always cache the first segment */
15.         while ((there is not enough free space for segment i) && (replacement
16.             candidate can still be found)){
17.             compute caching priority function for all the objects in the cache
18.             find the eviction victim /* entry with less valuable priority */
19.             removes the last segment of the eviction victim and increase free space
20.         }
21.         if (there is enough free space for segment i of object a)
22.             cache segment i
23.     }
24. }
```

It is noted that the above pseudo-code indicates that if there is not available space in the cache, two situations can occur: it this approach shows an improved byte-hit ratio. A pseudo-code for the PCAA is illustrated below.

```
1.  if (there is enough free space for object i) {
2.      cache object i
3.  }else{ /* always cache the entire object */
4.      while ((there is not enough free space for object i) && (replacement candidate
```

-continued

```
5.           can still be found)){
6.                    compute caching priority function for all the objects in the cache
7.                    find the eviction victim /* entry with less valuable priority */
8.                    remove the last segment of the eviction victim and increase free space
9.                    }
10.                   if (there is enough free space for segment i of object a)
11.                           cache segment i
12. }
```

The pseudo-code indicates that when the cache is not full and there is enough space for the entire object, the object is cached (see lines 1-2 of the code). If the cache is full, the eviction victim is chosen based on the priority function CP, and the segments of the eviction victim object are removed until enough space is released for the new object. If the space released is not enough, another object is chosen to be evicted, until enough space is released for the new object.

Figure 5:
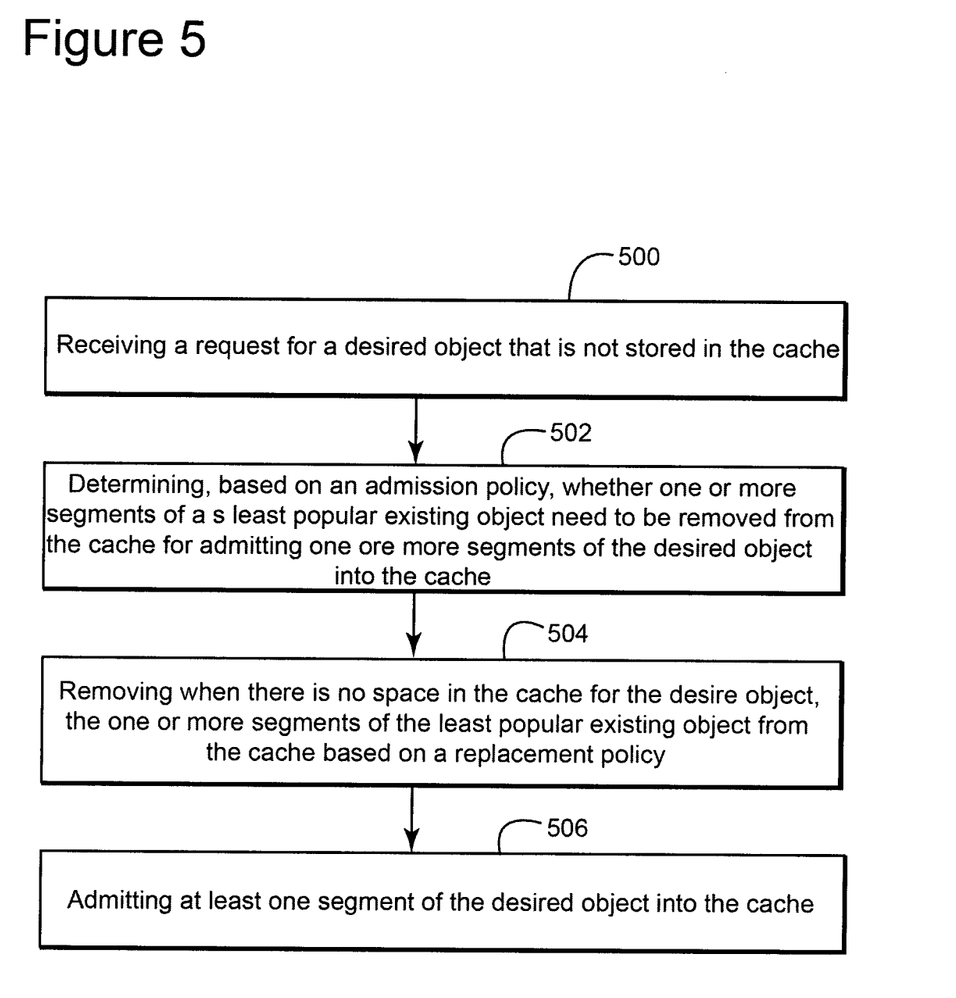
FIG. 5 is a flowchart of a method for replacing objects in a cache according to an exemplary embodiment.

According to an exemplary embodiment illustrated in FIG. 5, there is a method for managing objects in a cache. The method includes a step 500 of receiving a request for a desired object that is not stored in the cache; a step 502 of determining, based on an admission policy, whether one or more segments of a least popular existing object need to be removed from the cache for admitting one or more segments of the desired object into the cache; a step 504 of removing, when there is no space in the cache for the desired object, the one or more segments of the least popular existing object from the cache based on a replacement policy; and a step 506 of admitting at least one segment of the desired object into the cache.

Figure 6:
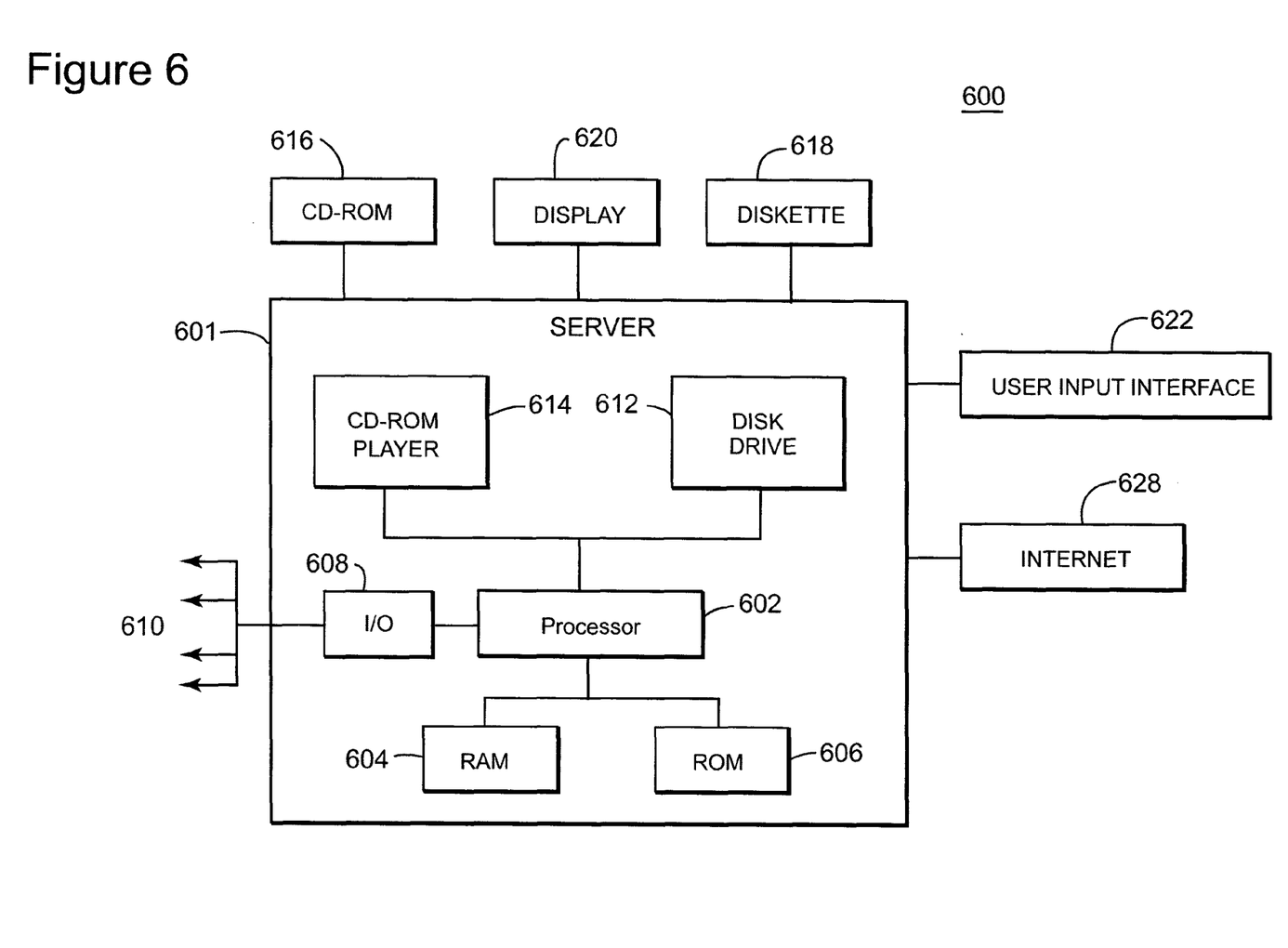
FIG. 6 is a schematic diagram of a cache.

For purposes of illustration and not of limitation, an example of a representative cache capable of carrying out operations in accordance with the exemplary embodiments is illustrated in FIG. 6.

An example of a representative cache capable of carrying out operations in accordance with the exemplary embodiments is illustrated in FIG. 6. Hardware, firmware, software or a combination thereof may be used to perform the various steps and operations described herein.

The exemplary cache 600 suitable for performing the activities described in the exemplary embodiments may include a server 601. Such a server 601 may include a central processor (CPU) 602 coupled to a random access memory (RAM) 604 and to a read-only memory (ROM) 606. The ROM 606 may also be other types of storage media to store programs, such as programmable ROM (PROM), erasable PROM (EPROM), etc. The processor 602 may communicate with other internal and external components through input/output (I/O) circuitry 608 and bussing 610, to provide control signals and the like. The processor 602 carries out a variety of functions as is known in the art, as dictated by software and/or firmware instructions.

The server 601 may also include one or more data storage devices, including hard and floppy disk drives 612, CD-ROM drives 614, and other hardware capable of reading and/or storing information such as DVD, etc. In one embodiment, software for carrying out the above discussed steps may be stored and distributed on a CD-ROM 616, diskette 618 or other form of media capable of portably storing information. These storage media may be inserted into, and read by, devices such as the CD-ROM drive 614, the disk drive 612, etc. The server 601 may be coupled to a display 620, which may be any type of known display or presentation screen, such as LCD displays, plasma display, cathode ray tubes (CRT), etc. A user input interface 622 is provided, including one or more user interface mechanisms such as a mouse, keyboard, microphone, touch pad, touch screen, voice-recognition system, etc.

The server 601 may be coupled to other computing devices, such as the landline and/or wireless terminals and associated watcher applications, via a network. The server may be part of a larger network configuration as in a global area network (GAN) such as the Internet 628, which allows ultimate connection to the various landline and/or mobile client/watcher devices.

The two novel approaches discussed above are more efficient than the existing algorithms. For showing some of the advantages between the novel approaches and the existing algorithms, the following metrics are used for illustrating this point.

Some of the main metrics used in the art to evaluate algorithm performances are Byte Hit Ratio (BHR), Delayed Start Request Ratio (DS), and Balanced Performance (BP).

The Byte Hit Ratio is a metric that aims to measure how many bytes are delivered straight to the client from the proxy cache, normalized by the total bytes requested by the client. This metric need to be maximized and it measures the efficiency of the algorithms on reducing the network traffic between the cache and the original server. A mathematical expression for BHR is given by:

$$BHR = \frac{\text{bytes delivered from the cache}}{\text{requested bytes}}.$$

The Delayed Start Request Ratio is a metric which measures how many requests had startup latency among the total number of requests because the initial segments of the requested object were not cached on the proxy-cache. This metric captures the efficiency of the algorithms on reducing the startup delay for the end users, helping to improve QoE, and needs to be minimized. A mathematical expression for DS is given by:

$$DS = \frac{\text{number of misses}}{\text{number of requested objectts}}.$$

The Balanced Performance is a metric that combines byte hit and delayed start in a single score, aiming to show which caching technique is able to achieve the best performance for both metrics simultaneously. Analyzing the results based on BP makes it possible to understand the algorithms' behavior in terms of these two desired metrics. It is known in the art that it is difficult to achieve optimal results for both metrics. In general, a higher byte hit ratio implies an undesirable increase in the delayed start; on the other hand, techniques directed to reduce the delayed start metric in general have as a consequence a reduction in the byte hit ratio. Balanced Performance ratio (BP) helps to understand this behavior and provides information in just one composite indicator. The BP is calculated as the ratio between BHR and DS.

Having introduced the main metrics for determining the efficiency of the caching algorithms, the novel caching algorithms are now compared with some existing ones. Considering the byte hit ratio, the PCCA and PCAA approaches are compared with LRLFU, Lazy and Pyramid using synthetic traces. A synthetic scenario with 50,000 requests directed to a high number of objects (20,000) is considered. The percentage of cacheable objects is 30%, and the objects' popularity follows a skewed Zipf ($\alpha=0.8$) distribution. The videos have an average size of 10 MB (small videos).

Figure 7:
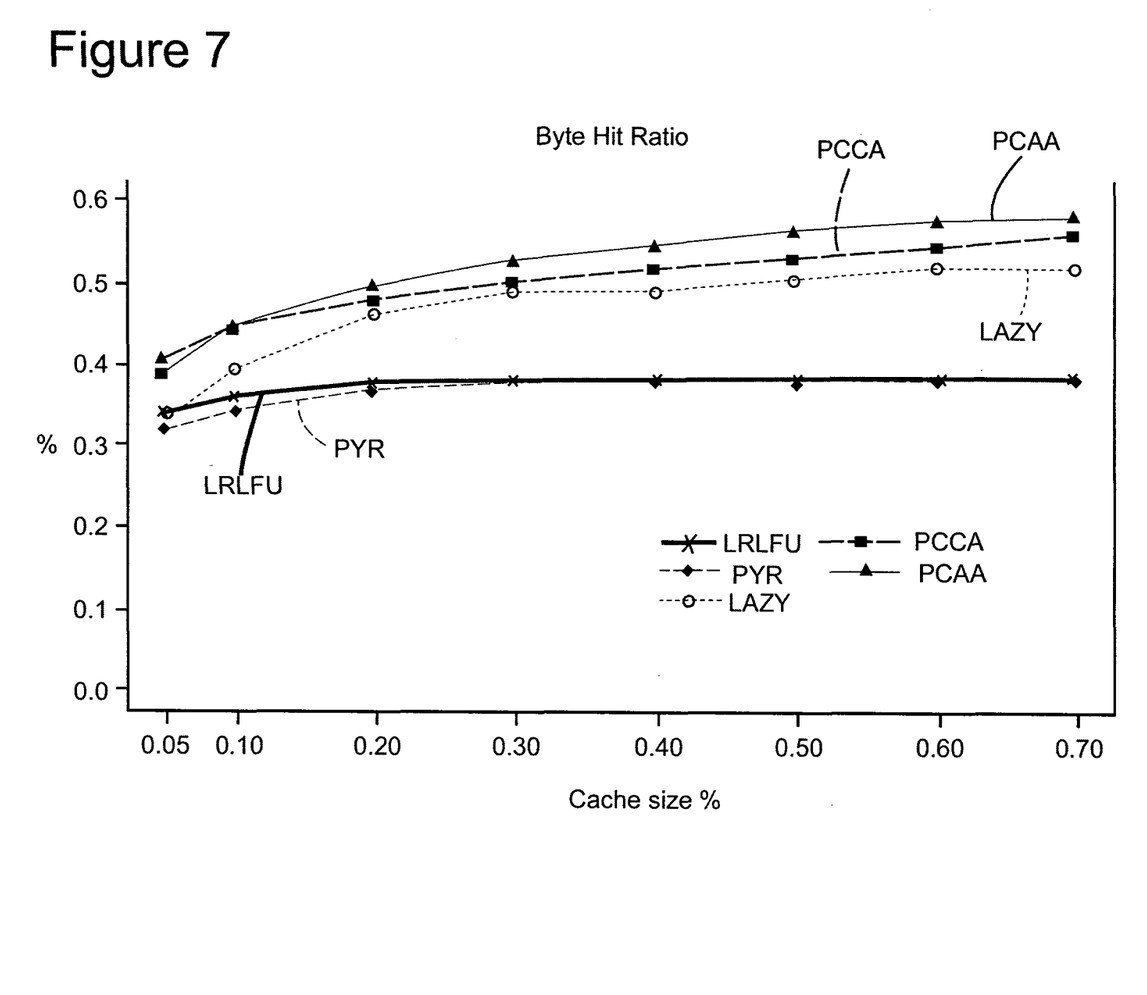
FIG. 7 is a graph comparing a byte hit ratio metric for the novel embodiments and existing approaches.

FIG. 7 shows the byte hit ratio plotted versus the cache size. The byte hit ratio is plotted for the novel approaches and for the existing strategies, LRLFU, Pyramid and Lazy. The Lazy strategy is used as a baseline for byte hit ratio, while LRLFU and Pyramid are the baselines for the percentage of delayed starts.

The PCAA approach obtains the best performance for byte hit ratio among all algorithms. At small cache sizes, the byte hit ratio is lower, starting from 39% and increasing when the cache size increases, until reaching 58% at a cache size of 70%. The performance of PCCA approach is similar to PCAA until a cache size of 20%, becoming worse than that for larger cache sizes. However, the growth of PCCA performance follows the same trend of PCAA.

The Lazy algorithm obtains a byte hit ratio performance worse than PCAA approach. At a small cache size of 5% the difference is larger, decreasing for cache sizes of 20% and 30% and increasing again from a cache size of 40%. While PCAA performance increases at a constant rate, Lazy approach presents a more unstable behavior.

Turning to the delayed start metric, this metric is plotted in FIG. 8 again for the same approaches as shown in FIG. 7. In general, LRLFU and Pyramid obtain better results for the delayed start. PCCA approach obtains a delayed start performance similar to LRLFU and Pyramid for all cache sizes. The performance of these three approaches is better and significantly different from Lazy and PCAA that obtain the worst performance in this scenario.

Figure 8:
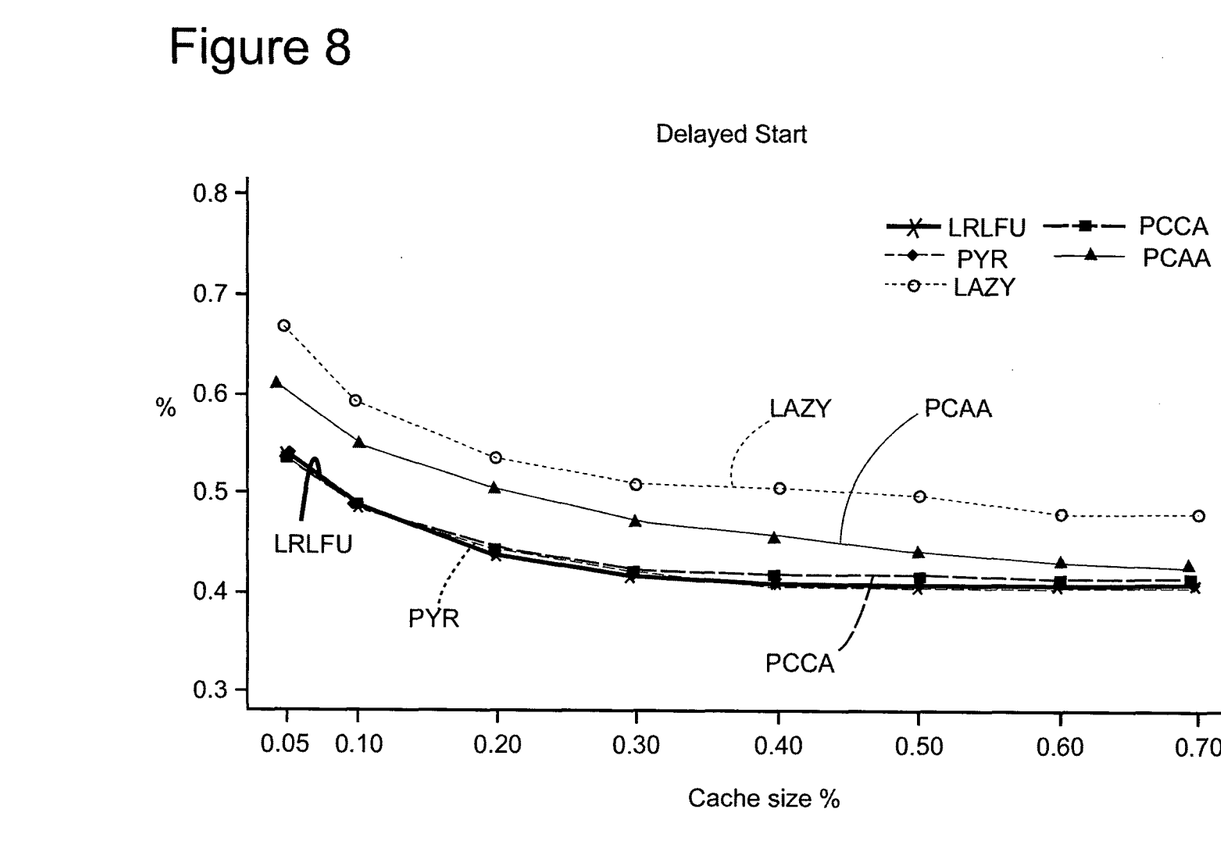
FIG. 8 is a graph comparing a delayed start metric for the novel embodiments and existing approaches.

PCCA approach also shows to be more efficient than Lazy and PCAA. As PCAA and Lazy always insert the complete video at the first request, the cache becomes full faster. So, a fewer number of objects are found in the cache, which possibly causes a decrease in the algorithms' efficiency for delayed starts.

In addition, it is observed that the aggressive approach (PCAA) and Lazy obtain similar performance at smaller cache sizes, but the performance of PCAA increases with the cache size, while Lazy's performance almost stabilize at a cache size of 30%. At large cache sizes (60-70%), the performance of PCAA is similar to LRLFU, Pyramid and PCCA.

It is noted that the approach that achieves the best byte hit ratio does not obtain the best delayed start. In this scenario, while PCAA reaches the best byte hit ratio, PCCA, LRLFU and Pyramid achieve the best delayed start.

Figure 9:
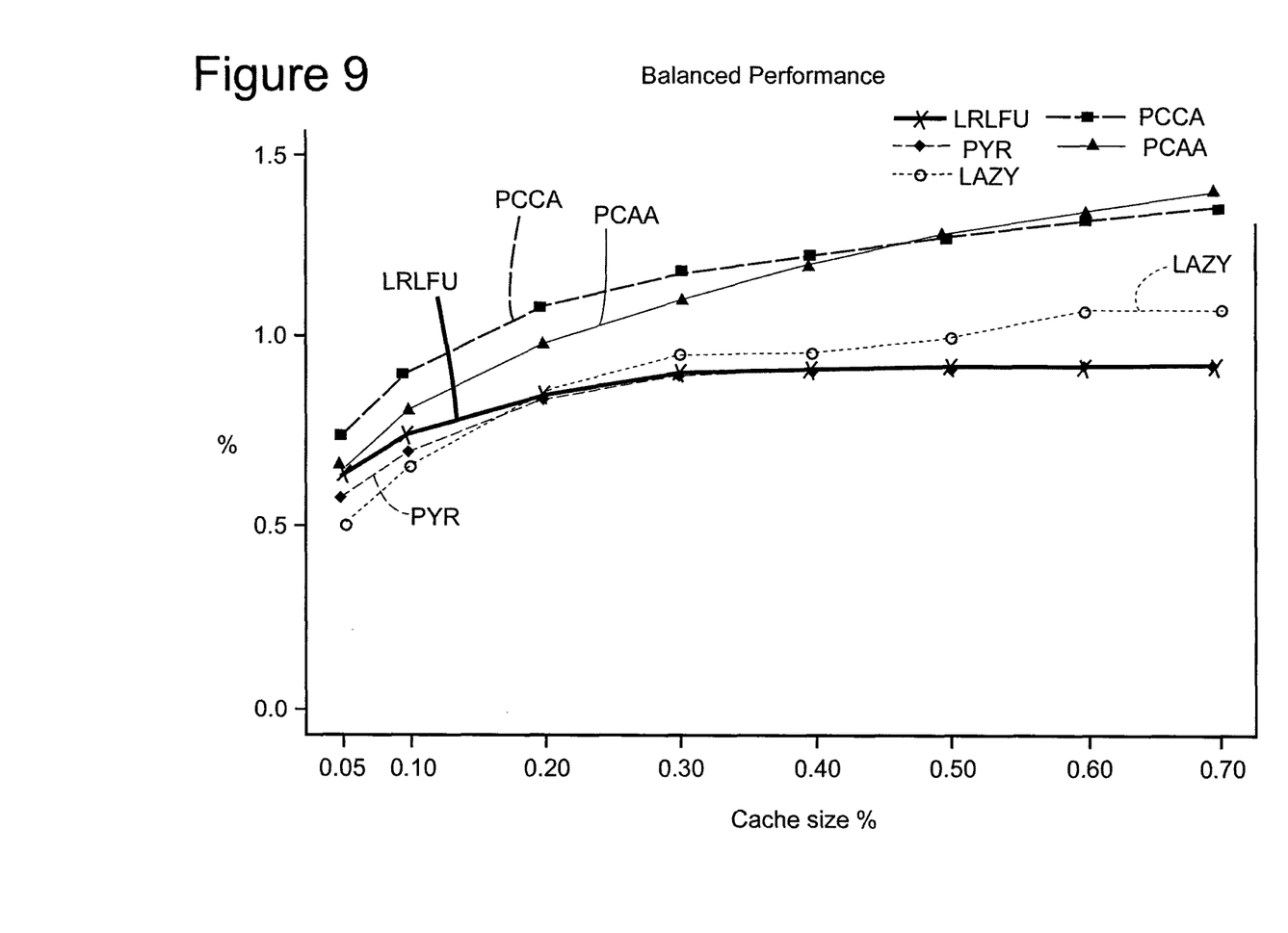
FIG. 9 is a graph comparing a balanced performance metric for the novel embodiments and existing approaches.

Considering now the balanced performance metric, it is noted that both novel approaches provide a better result than the other approaches. The balanced performance metric is used as an indicator to show which approach provides the best equilibrium between byte hit ratio and delayed start in a given scenario. This metric is the ratio between byte hit ratio and delayed start, and is useful to compare the approaches in the same scenario, not between distinct scenarios (in distinct scenarios the scale may have different values). FIG. 9 shows the balanced performance versus the cache size for the same basic scenario of FIG. 7.

The balanced performance metric shows that PCCA approach provides the best equilibrium between byte hit ratio and delayed start for all cache sizes. The result for PCCA is mainly influenced by the delayed start. Although PCCA obtains a byte hit ratio very close to PCAA at small cache sizes, it obtains a lower delayed start than PCAA, which results in a best balanced performance for PCCA.

Although LRLFU and Pyramid obtain the best delayed start at small cache sizes, they provide the worst byte hit of the scenario. Thus, their balanced performance is lower than PCCA and PCAA even for small cache sizes. With regard to Lazy, even though this approach achieves a high byte hit ratio, the delayed start is also high (implying a low performance). Thus, the balanced performance of Lazy is lower than that achieved by the other approaches at small cache sizes, and just overcomes LRLFU and Pyramid for larger cache sizes.

From these comparisons, it is noted that the novel approaches presented in the exemplary embodiments provide some advantages. One is the fact that the novel approaches provide a better byte hit ratio. The results achieved by the aggressive approach PCAA overcome the Lazy algorithm, an important approach used as the benchmark for the results shown in FIGS. 7-9. The enhanced byte hit ratio has as a direct consequence the reduction in the bandwidth consumption and the decreasing in network congestion.

Another advantage is to provide an approach that is able to achieve the best balance between byte hit ratio and delayed start performance. The conservative PCCA approach is able to obtain delayed start results close to the benchmarks (Pyramid and LRLFU methods) while achieving a byte hit ratio close to the best result (close to PCAA). As these two metrics are difficult to balance, this is an important achievement.

The disclosed exemplary embodiments provide a cache, a method and a computer program product for more efficiently storing and removing media files from a cache. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method for managing objects in a cache, the method comprising:
   receiving a request for a desired object that is not stored in the cache;
   determining, based on an admission policy, whether one or more segments of a least popular existing object need to be removed from the cache for admitting one or more segments of the desired object into the cache, wherein a popularity for each object in the cache is calculated based upon how new each object is and by estimating each object's access frequency;
   removing, when there is no space in the cache for the desired object, the one or more segments of the least popular existing object from the cache based on a replacement policy, wherein the replacement policy includes a caching priority function for determining that the least popular existing object is the least popular object of all objects stored by the cache; and
   admitting at least one segment of the desired object into the cache.

2. The method of claim 1, further comprising:
   calculating the caching priority function for all the objects of the cache before removing the least popular existing object, wherein the caching priority function calculates a least popular value for a whole object and not for each segment of the object.

3. The method of claim 1, wherein the caching priority function is given by:

$$CP = \frac{n}{(T_c - T_r)} * \text{MIN}\left\{1, \frac{T_r - T_1}{\frac{n}{T_c - T_r}}\right\},$$

n is a number of accesses of the object, Tc is a current timestamp, T1 is a first access time of the object, and Tr is a last access time of the object.

4. The method of claim 1, further comprising:
   applying a dynamic exponential segmentation to the desired object,
   wherein the dynamic exponential segmentation assigns a length to a first segment of the desired object that is equal to a fixed fraction of a total length of the desired object, and a next segment has a length exponentially larger than of a previous segment.

5. The method of claim 1, wherein the admission policy comprises:
   admitting during a first phase the entire desired object if there is enough space in the cache; and
   admitting during a second phase a prefix of the desired object when a first request of the desired object is received and there is not enough space for the entire desired object, and, later on, based upon further requests, admitting other segments of the desired object.

6. The method of claim 5, wherein a prefix of an existing object is replaced only by a prefix of a new object.

7. The method of claim 1, wherein the admission policy comprises:
   admitting during a first phase the entire desired object if there is enough space in the cache; and
   admitting during a second phase the entire desired object when a first request of the desired object is received and there is not enough space for the entire desired object, wherein one or more segments of exiting objects are removed for providing a necessary space for the entire desired object.

8. The method of claim 7, wherein a prefix of an existing object is removed to provide more space for the desired object.

9. A cache having an algorithm for managing objects, the cache comprising:
   a storing device for storing the objects; and
   a processor connected to the storing device and configured to execute the algorithm to,
      receive a request for a desired object that is not stored in the storing device,
      determine, based on an admission policy, whether one or more segments of a least popular existing object need to be removed from the storing device for admitting one or more segments of the desired object, wherein a popularity for each object in the cache is calculated based upon how new each object is and by estimating each object's access frequency,
      remove, when there is no space in the storing device for the desired object, the one or more segments of the least popular existing object based on a replacement policy, wherein the replacement policy includes a caching priority function for determining that the least popular existing object is the least popular object of all objects stored by the storing device, and
      admit at least one segment of the desired object into the storing device.

10. The cache of claim 9, wherein the processor is further configured to:
    calculate the caching priority function for all the objects of the storing device before removing the least popular existing object, wherein the caching priority function calculates a least popular value for a whole object and not for each segment of an object.

11. The cache of claim 10, wherein the caching priority function is given by:

$$CP = \frac{n}{(T_c - T_r)} * \text{MIN}\left\{1, \frac{T_r - T_1}{\frac{n}{T_c - T_r}}\right\},$$

n is a number of accesses of the object, Tc is a current timestamp, T1 is a first access time of the object, and Tr is a last access time of the object.

12. The cache of claim 9, wherein the processor is further configured to:
    apply a dynamic exponential segmentation to the desired object,
    wherein the dynamic exponential segmentation assigns a length to a first segment of the desired object that is equal to a fixed fraction of a total length of the desired object, and a next segment has a length exponentially larger than of a previous segment.

13. The cache of claim 9, wherein the admission policy comprises:
    a first phase of admitting the entire desired object if there is enough space in the storing device; and
    a second phase of admitting a prefix of the desired object when a first request of the desired object is received and there is not enough space for the entire desired object, and, later on, based upon further requests, admitting other segments of the desired object.

14. The cache of claim 13, wherein a prefix of an existing object is replaced only by a prefix of a new object.

15. The cache of claim 9, wherein the admission policy comprises:
    a first phase of admitting the entire desired object if there is enough space in the cache; and
    a second phase of admitting the entire desired object when a first request of the desired object is received and there is not enough space for the entire desired object, wherein one or more segments of exiting objects are removed for providing a necessary space for the desired object.

16. The cache of claim 15, wherein a prefix of an existing object is removed to provide more space for the desired object.

17. The cache of claim 9, wherein the caching priority function includes an access frequency of an object, an access number of the object, and a probability of future access of the object, and the access frequency, the access number and the probability of future access are stored in the cache for each existing object.

18. The cache of claim 9, wherein the processor is further configured to,
    calculate the caching priority function each time a determination is made that there is not enough space in the storing device for a new object and a segment from the at least popular existing object has been removed.

19. A non-transitory computer readable storage medium including computer executable instructions, wherein the instructions, when executed by a processor, implement a method for managing objects in a cache, the method comprising:
    receiving a request for a desired object that is not stored in the cache;
    determining, based on an admission policy, whether one or more segments of a least popular existing object need to be removed from the cache for admitting one or more segments of the desired object into the cache, wherein a popularity for each object in the cache is calculated based upon how new each object is and by estimating each object's access frequency;
    removing, when there is no space in the cache for the desired object, the one or more segments of the least popular existing object from the cache based on a replacement policy, wherein the replacement policy includes a caching priority function for determining that the least popular existing object is the least popular object of all objects stored by the cache; and
    admitting at least one segment of the desired object into the cache.

20. The non-transitory computer readable storage medium of claim 19, further comprising:
    calculating the caching priority function for all the objects of the cache before removing the least popular existing object, wherein the caching priority function calculates a least popular value for a whole object and not for each segment of an object.

* * * * *